United States Patent
Biondi

(10) Patent No.: US 6,622,246 B1
(45) Date of Patent: Sep. 16, 2003

(54) METHOD AND APPARATUS FOR BOOTING AND UPGRADING FIRMWARE

(75) Inventor: Mark C. Biondi, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/439,611

(22) Filed: Nov. 12, 1999

(51) Int. Cl.$^7$ .............................................. G06F 9/445
(52) U.S. Cl. ............................ 713/100; 713/2; 714/54
(58) Field of Search ...................... 713/100, 2; 714/54

(56) References Cited

U.S. PATENT DOCUMENTS

| | | | |
|---|---|---|---|
| 5,003,591 A | * 3/1991 | Kauffman et al. | 380/232 |
| 5,432,927 A | * 7/1995 | Grote et al. | 713/2 |
| 5,495,611 A | 2/1996 | Bealkowski et al. | |
| 5,568,641 A | * 10/1996 | Nelson et al. | 713/2 |
| 5,623,604 A | * 4/1997 | Russell et al. | 717/167 |
| 5,704,031 A | * 12/1997 | Mikami et al. | 714/4 |
| 5,781,921 A | 7/1998 | Nichols | |
| 5,784,551 A | 7/1998 | De Leva et al. | |
| 5,812,857 A | 9/1998 | Nelson et al. | |
| 5,878,256 A | * 3/1999 | Bealkowski et al. | 713/2 |
| 5,937,434 A | * 8/1999 | Hasbun et al. | 711/170 |
| 5,940,074 A | * 8/1999 | Britt, Jr. et al. | 345/749 |
| 5,974,454 A | 10/1999 | Apfel et al. | |
| 5,974,461 A | 10/1999 | Goldman et al. | |
| 5,987,605 A | * 11/1999 | Hill et al. | 713/2 |
| 6,009,500 A | * 12/1999 | Rossi | 711/162 |
| 6,070,012 A | * 5/2000 | Eitner et al. | 717/168 |
| 6,357,021 B1 | * 3/2002 | Kitagawa et al. | 714/41 |

FOREIGN PATENT DOCUMENTS

| | | | |
|---|---|---|---|
| DE | 790554 A1 | * 8/1997 | ........... G06F/9/445 |
| EP | 0 790 554 A1 | 8/1997 | |
| WO | WO 99/42924 | 8/1999 | |

* cited by examiner

Primary Examiner—Thomas Lee
Assistant Examiner—Eric Chang
(74) Attorney, Agent, or Firm—Oliff & Berridge, PLC

(57) ABSTRACT

A method for writing software into a programmable memory and a method for initiating program control are provided. A host computer loads new firmware from an external source. The computer then checks two firmware spaces to determine which firmware space is erased or which firmware space is valid. The computer then stores the new firmware in the firmware space that is erased or not valid.

To initiate program control, the host computer determines whether either of firmware spaces are erased and then executes programs from the firmware space that is not erased. If both firmware spaces contain firmware, then the host computer may determine the validity of the firmware using a checksum. The host computer will then execute programs from the firmware space containing valid firmware.

26 Claims, 6 Drawing Sheets

METHOD AND APPARATUS FOR BOOTING AND UPGRADING FIRMWARE

BACKGROUND OF THE INVENTION

1. Field of Invention

This invention relates to methods for storing computer programs and methods for initiating program control.

2. Description of Related Art

The majority of computer peripherals, such as image scanners, modems, and printers, typically employ an on-board controlling system including alterable memory, such as random access memory (RAM), which may be volatile and/or non-volatile, and nonalterable memory, such as read only memory (ROM), and various hardware circuits that facilitate firmware transfer. One drawback to early peripheral devices was the inability to upgrade and improve the software within the devices without requiring a service technician to physically remove the old programs contained on the non-alterable memory and install a new non-alterable memory containing the upgraded software.

As non-volatile memories improved, especially flash electrically erasable programmable read only memory (EEPROM), hardware vendors developed techniques to remotely download and store upgraded software onto the peripherals. The methods typically involved providing the peripheral device with the new software, and then directing the on-board controller in the peripheral device to store the new program within the non-volatile alterable memory. The software and the storing of such software in non-alterable memory are commonly referred to in combination as firmware.

However, one drawback to this method for downloading and storing the new firmware is that data and programs could be corrupted, thus rendering the system useless, if, during this firmware upgrade routine, the process is interrupted by, for example, an unexpected loss of power. Often, when this occurs, the only remedy to fix the peripheral is to deploy a service technician to physically replace the non-volatile alterable memory or even to replace an entire circuit board.

SUMMARY OF THE INVENTION

This invention provides systems, methods and architectures that enable recoverable software upgrading of software contained in a non-volatile alterable memory.

This invention separately provides a firmware architecture that allows recovery from failed firmware upgrading procedures.

This invention separately provides a firmware architecture that allows a firmware upgrade without removing the upgraded firmware.

In various exemplary embodiments of this invention, a system containing firmware includes memory storing a bootstrap program. The system further includes a non-volatile alterable memory having at least two firmware memory spaces. The first one of the firmware memory spaces stores a current firmware program.

When that firmware program is to be upgraded, the upgrade firmware is received and stored in a second one of the at least two memory spaces. After the upgrade firmware is completely received and stored in that second memory space, the original firmware in the first memory space is erased or otherwise marked as no longer being valid. Thus, the only valid firmware is then the upgrade firmware in the second memory space. The bootstrap program accesses which ever memory space contains valid firmware.

Other features and advantages of various exemplary embodiments of the methods and systems of this invention will be described below or will become apparent from the accompanying drawings and from the detailed description which follows.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

Figure 1:
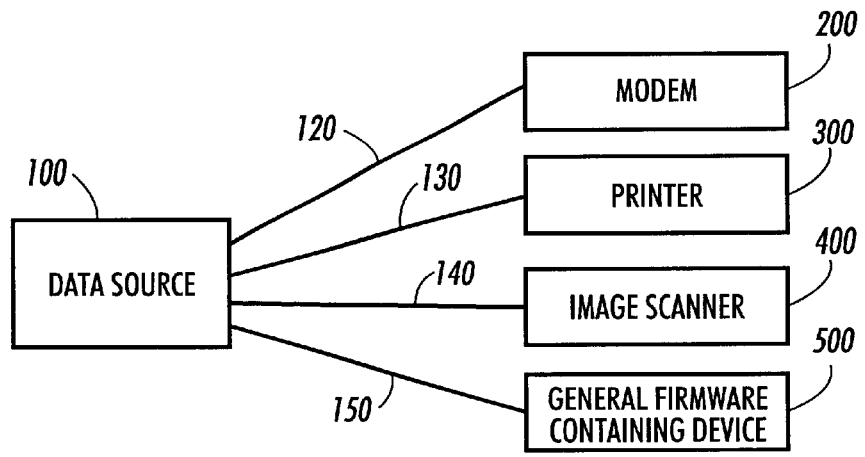
FIG. 1 is a block diagram of a firmware data source and various firmware-containing devices.

FIG. 1 is a block diagram of a system for upgrading firmware using a firmware data source 100 that can be connected to one or more of a modem 200 through a first link 120, a printer 300 through a second link 130, an image scanner 400 through a third link 140, or any other known or later developed firmware containing device, such as the general firmware containing device 500, which is connected to the firmware data source 100 via a fourth data link 150. New, upgrade or replacement firmware can be transferred from the firmware data source 100 to the various firmware containing devices 200–500 through the links 110–150.

The firmware data source 100 can be any known or later developed data source that is capable of providing new programs firmware to the firmware containing devices 200–500. Similarly, the links 120–150 can each be any known or later developed devices, software utilities or systems for connecting the firmware containing device 200–500 to the firmware data source 100, including a direct cable connections such as a serial bus or a SCSI port, connections over a wide area network or a local area network, connections over an intranet or extranet, connections over the Internet, or connections over any other distributed processing network or system.

Furthermore, the firmware data source 100 and the respective link may both be inserted, in whole or in part, within the firmware containing device 500. For example, the firmware data source 100 can be a floppy disk drive inserted into the firmware containing device and the respective link 150 can be a disk drive controller and connecting cable hardware.

Figure 2:
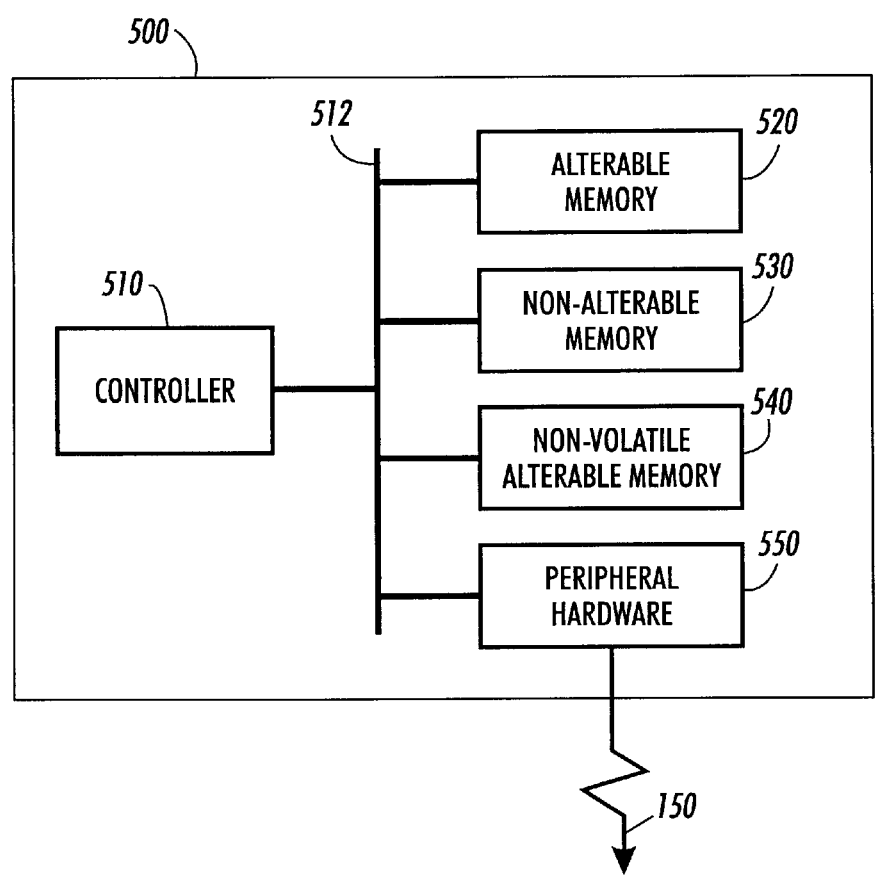
FIG. 2 is a block diagram of one exemplary embodiment of a firmware containing device according to this invention.

FIG. 2 is one exemplary embodiment of the firmware containing device 500. The firmware containing device 500 contains a controller 510, an optional alterable memory 520, an optional non-alterable memory 530, a non-volatile alterable memory 540, and peripheral hardware 550. Communication between the controller 510 and the various memories 520–540 and the peripheral hardware 550 is accommodated using a bus 512.

The controller 510 carries out the various functions provided by the particular firmware containing device 500, including downloading new or replacement firmware based upon firmware stored in any one of the memories 520–550. The optional alterable memory 520 is a volatile, high-speed memory generally used to store programs and temporary data. The optional non-alterable memory 530 is a non-volatile memory that is used to store data and programs such as default system settings and basic input/output routines that will not need updating over time and that does not require power to be continuously provided.

The non-volatile alterable memory 540 is also capable of storing data and programs, but has the advantage of being both alterable and non-volatile, i.e. information is not lost when power is removed.

The firmware containing device 500 is connected to the outside world via the peripheral hardware 550 and the data link 150.

During power up, the controller 510 will transition from a reset state to a known operating state using preprogrammed instructions stored either in the non-alterable memory 530 or the non-volatile alterable memory 540. The controller 510 may continue to execute programs from the non-alterable memory 530 or the non-volatile alterable memory 540, or it may transfer various programs to the alterable memory 520, then execute the programs stored in the alterable memory 520.

During a program upgrade operation of the general firmware containing device 500, the firmware data source 100, using the link 150, will download new programs and data. As new programs are received by the controller 510, they are directed to the alterable memory 520 for temporary storage. The controller 510 will optionally perform a verification check on the new data and programs using a verification technique, such as a cyclic redundancy check or a checksum routine. Once the new data and programs are verified, the controller 510 then checks the non-volatile alterable memory 540 for the appropriate location to store the new information.

Figure 3:
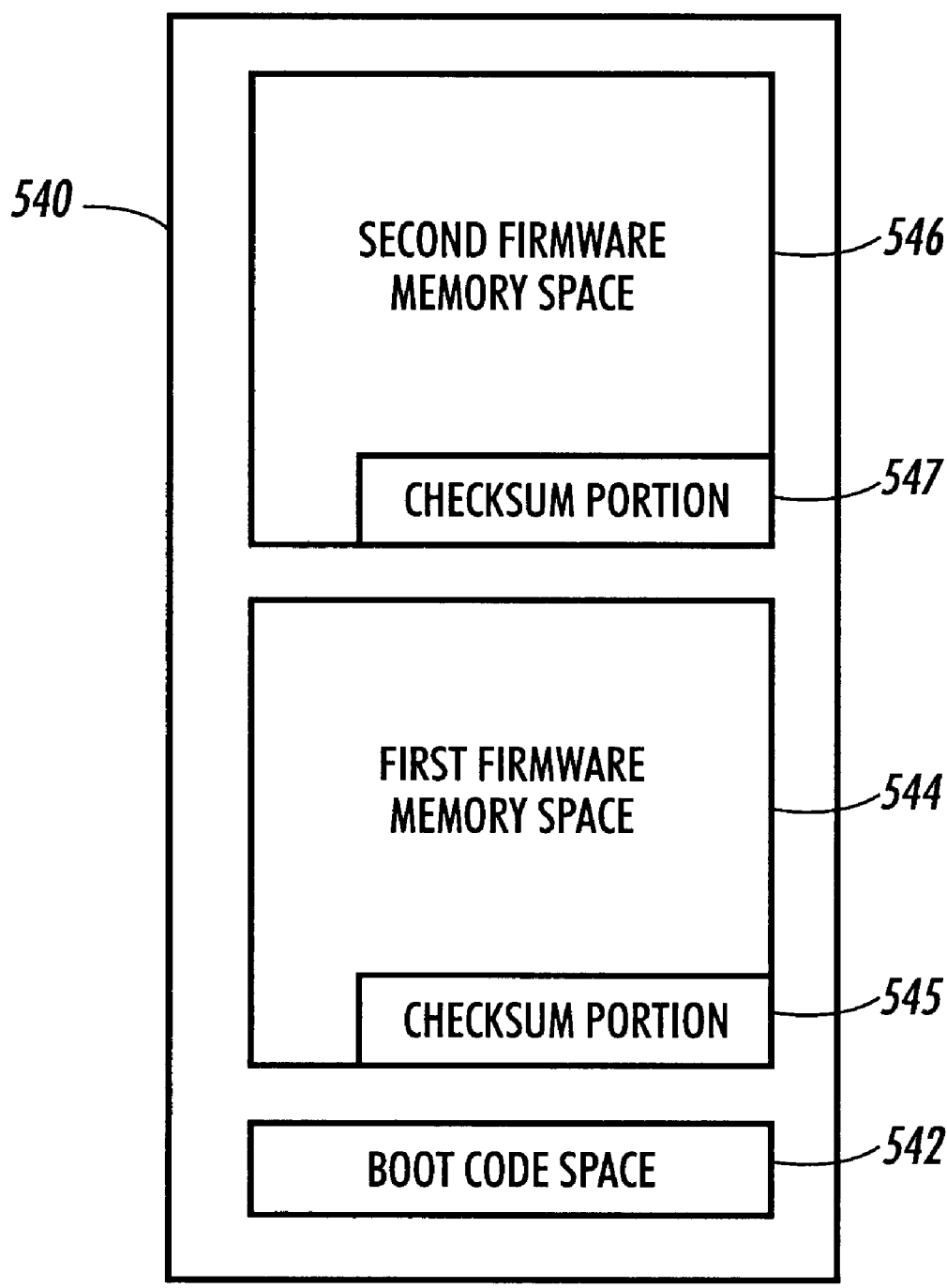
FIG. 3 is a block diagram of one exemplary embodiment of the non-volatile alterable memory of FIG. 2.

FIG. 3 shows in greater detail one exemplary embodiment of the architecture of the non-volatile alterable memory 540 of FIG. 2 according to this invention.

The boot code space 542 is provided as the default location from which the controller 510 will start operation after power-up. However, it should be appreciated that the boot space portion may instead be a portion of the non-alterable memory 530. The two firmware code spaces 544 and 546 are reserved to store the firmware used by the firmware containing device 500. Each firmware code space 544 and 546 is large enough to accommodate the complete firmware of the firmware containing device 500. While the boot code space 546 is depicted being smaller than the first or second firmware spaces 544 and 546 and the first and second firmware spaces 544 and 546 are depicted as equal in size, these spaces 542, 544 and 546 can be of any relative and absolute size.

The checksum memory portions 545 and 547 provide a measure of confidence of the validity of the data of their respective firmware spaces. While the first and second checksum memory portions 545 and 547 can be any size, in various exemplary embodiments of the non-volatile alterable memory according to this invention, the first and second checksum memory portions 545 and 547 are large enough to store at least 32 bits of data.

While various exemplary embodiments of the systems and methods according to this invention use a checksum to check the integrity of the respective firmware spaces 544 and 546, any known or later developed technique may be used to validate the data in the first and/or second checksum memory portions 545 and/or 542. For example, cyclic redundancy checks, multiple checksums, and techniques involving Markov models may be used.

During power-up, the controller 510 starts operation using instructions in the boot code space 542. During this time, the controller 510 will initialize various hardware, then determine which of the two firmware spaces 544 or 546 contains valid firmware. Upon identifying the proper firmware space 544 or 546, the controller 510, upon direction from instructions stored in the boot code space 542, will execute instructions stored in the identified firmware space 544 or 546.

Before storing the new firmware, the controller 510 must determine which of the two firmware spaces 545 or 546 contains valid firmware. When the firmware spaces 544 or 546 no longer store valid or current firmware, that firmware will typically be erased, marked as invalid or the firmware will not comply with the checksum. Alternatively, the controller 510 may define the current firmware space used by the controller 510 as the valid firmware space or may determine validity based on a record keeping scheme. It should be appreciated that any known or later developed technique that identifies which of the first and second firmware spaces 544 or 546 contains valid data can be used. Upon determining which of the first and second firmware spaces 544 or 546 contains valid and invalid firmware, the controller 510 will load the new data and programs into the firmware space 544 or 546 that does not contain valid firmware.

Figure 4:
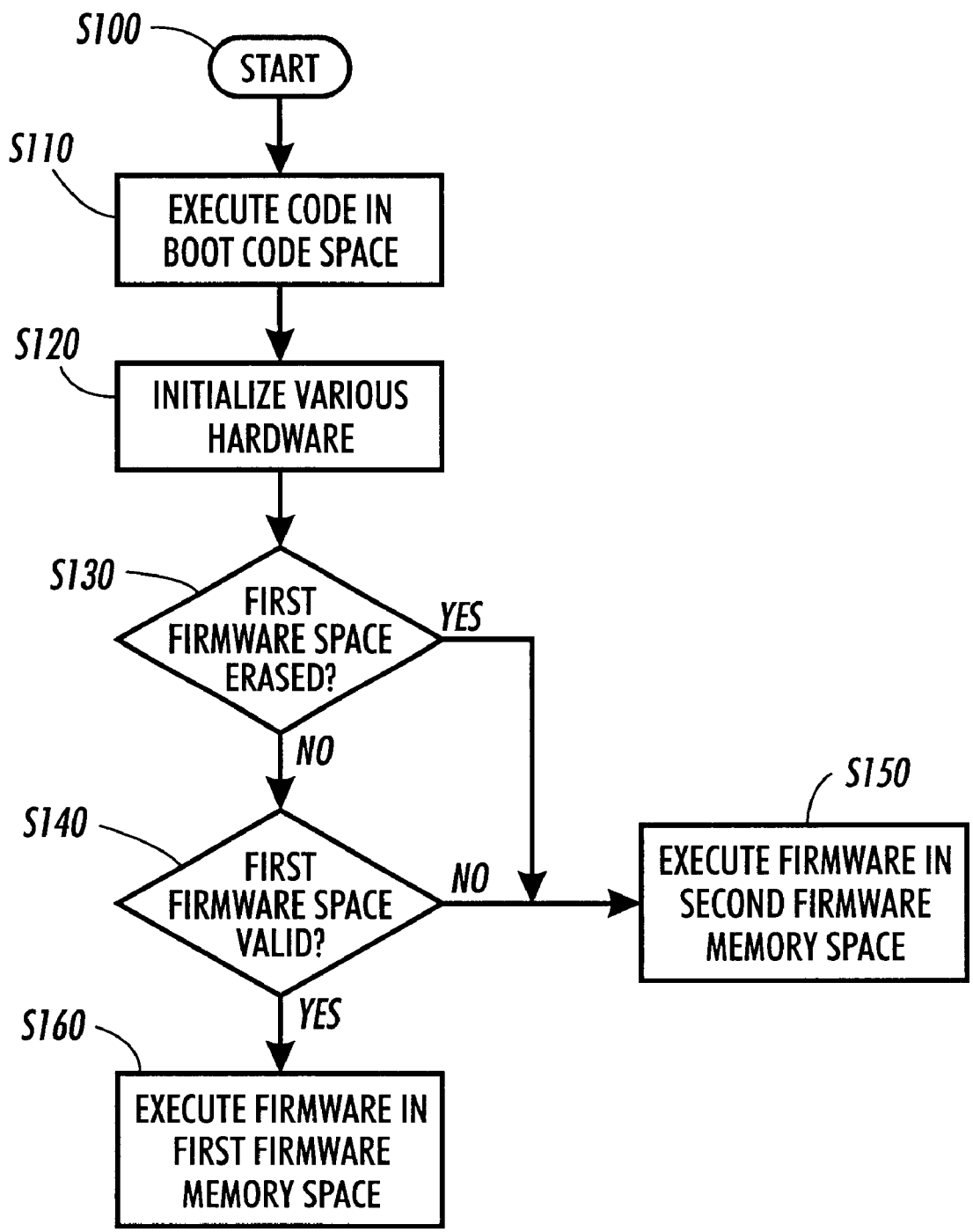
FIG. 4 is a flowchart outlining a first exemplary embodiment of a method for initiating program control according to this invention.

FIG. 4 is a flowchart outlining a first exemplary embodiment of a method for initiating program control according to the invention. Beginning in step S100, control continues to step S110, where the code in the boot code space is executed. Next, in step S120, various hardware elements of the firmware containing device are initialized, as required. For example, interrupt controllers, dynamic RAM controllers, various peripherals and various microprocessor registers may need be manipulated. Then, in step S130, a determination is made whether the first firmware space is erased. If the first firmware space is erased, control jumps to step S150, otherwise control continues to step S140.

In step S140, if the first firmware space is not erased, a determination is made whether the data in the first firmware space is valid. If the data in the first firmware space is not valid, control continues to step S150. Otherwise control jumps to step S160.

In step S150, the firmware in the first firmware space is executed. In contrast, in step S160, the firmware stored in the second firmware space is executed.

Figure 5:
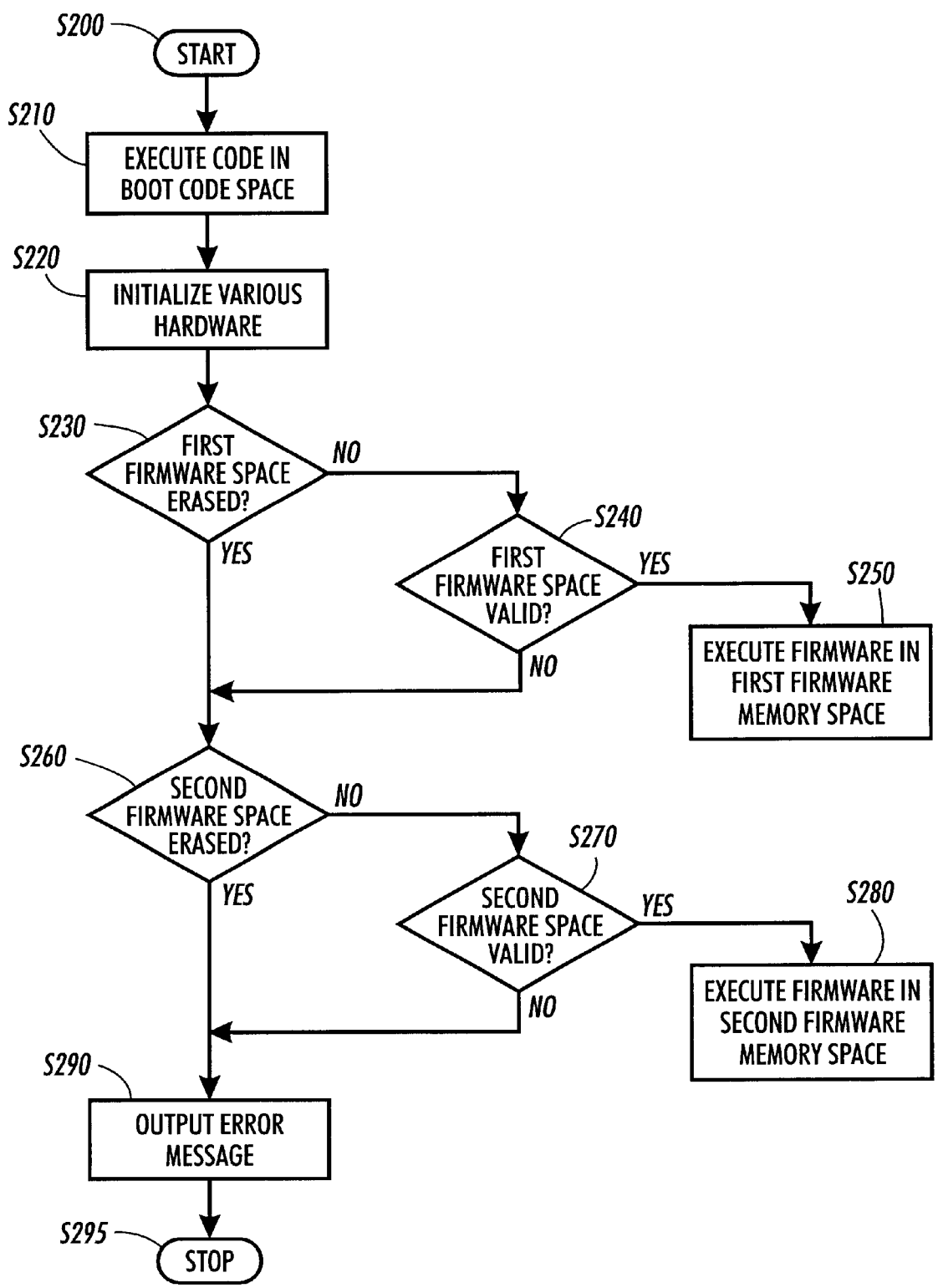
FIG. 5 is a flowchart outlining a second exemplary embodiment of a method for initiating program control according to this invention.

FIG. 5 is a flowchart outlining a second exemplary embodiment of a method for initiating program control according to the invention. Beginning with step S200, control continues to step S210, where code in the boot space is executed. Next, in step S220, various hardware elements are initialized as required. Control then continues to step S230.

In step S230, a determination is made whether the first firmware space 544 is erased. If the first firmware space is erased, control jumps to step S260. Otherwise, control continues to step S240. In step S240, if the first firmware space 544 is not erased, the validity of the data of the first firmware space 544 is checked. If the data of the first firmware space 544 is valid, control continues to step S250.

Otherwise, control jumps to step S260. In step S250, because the firmware in the first firmware space is valid and present, the firmware in the first firmware space 544 is executed.

If the first firmware space 546 is erased or that the data in the first firmware space 546 is not valid, step S260 is performed. In step S260, a determination is made whether the second firmware space 546 is erased. If the second firmware space 546 is not erased, control continues to step S270. Otherwise, control jumps to step S290.

In step S270, if the second firmware space is not erased, a determination is made whether the data of the second firmware space 546 is valid. If the data in the second firmware space 546 is valid, control continues to step S280. Otherwise, control jumps to step S290.

In step S280, because the data in the second firmware space 546 is both present and valid, the firmware in the second firmware space 546 is executed.

If the second firmware space 546 is erased or if the data of the second firmware space 546 is not valid, step S290 is performed. In step S290, an error message is displayed or output. The output error message may take any form, including a simple blinking light or detailed textual message describing the problem. The error message routine may also accommodate other functions, such as a simple download routine to accommodate download of new firmware programs. Control then continues to step S295, where the program initialization method ends.

Figure 6A:
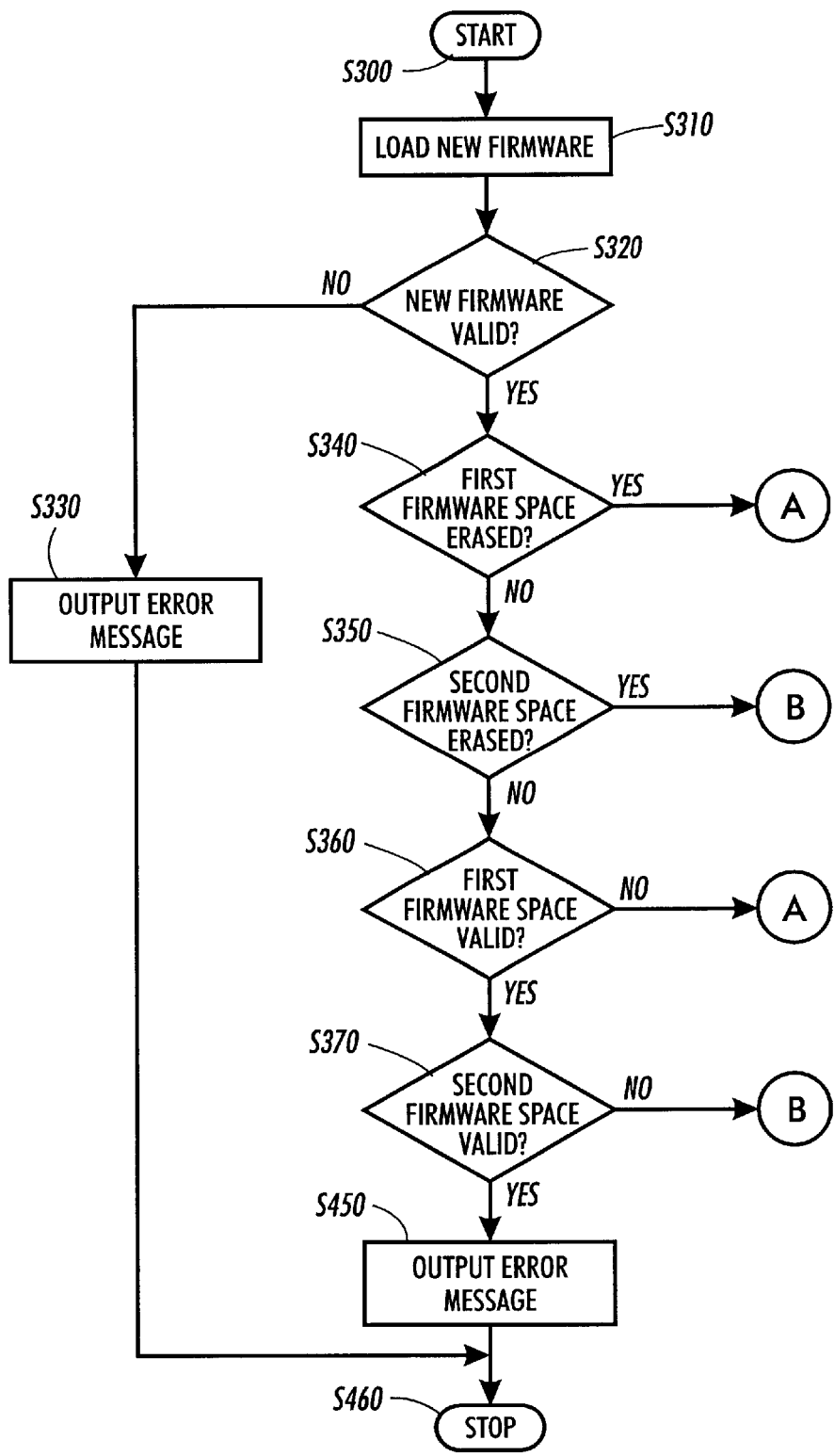
FIGS. 6A and 6B are a flowchart outlining an exemplary embodiment of a method for upgrading firmware according to this invention.
Figure 6B:
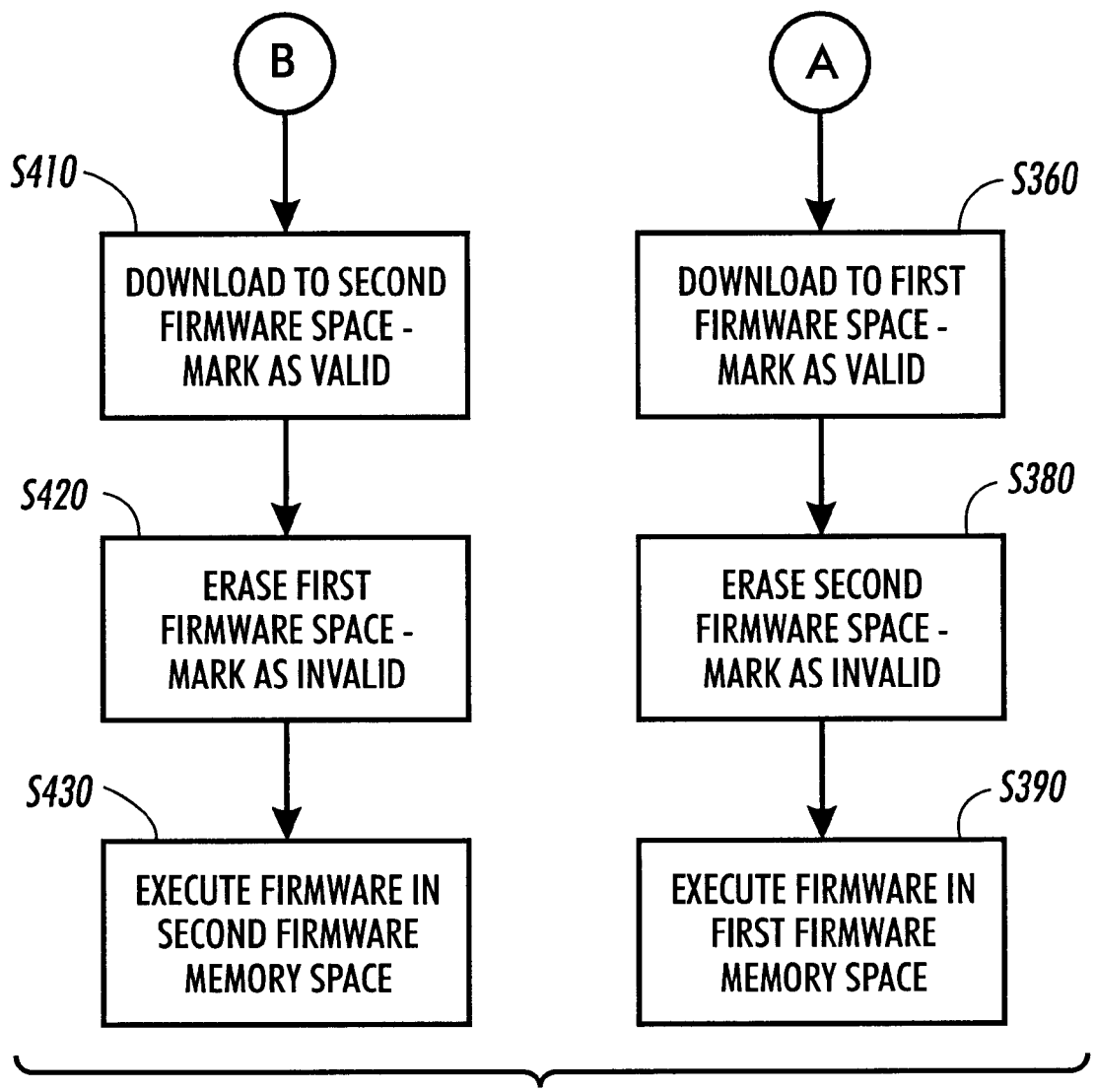

FIGS. 6A and 6B are a flowchart outlining one exemplary operation for loading and storing new programs and data control according to the invention. Beginning in step S300, control continues to step S310, where new firmware is acquired. Next, in step S320, a determination is made whether the new firmware is valid. If the data of the new firmware is not valid, control continues to step S330. Otherwise, control jumps to step S340.

In step S330, because the data of the new firmware data is not valid, an error message is displayed or output. Control then jumps to step S460.

In step S340, because the new firmware data is valid, a determination is made whether the first firmware space 544 is erased. If the first firmware space 544 is erased, control jumps to step S380. Otherwise, control continues to step S350.

In step S350, because the first firmware space is not erased, a determination is made whether the second firmware space is erased. If the second firmware space is erased, control jumps to step S410. Otherwise, control continues to step S360.

In step S360, because the second firmware space is not erased, a determination is made whether the first firmware space is valid. If the first firmware space is valid, control continues to step S370. Otherwise, control jumps to step S380.

In step S370, because the first firmware space is valid, a determination is made whether the second firmware space is valid. If the second firmware space is valid, control jumps to step S450, otherwise control jumps to step S410.

In step S380, because either the first firmware space is erased or the first firmware space is not valid, the new firmware is downloaded to the first firmware space and, optionally, the first firmware space is marked as valid. Then, in step S390, the second firmware space is erased and/or marked as invalid. Next, in step S400, the firmware in the first firmware memory space is executed.

In contrast, in step S410, because either the second firmware space is erased or the second firmware space is not valid, the new firmware is stored in the second firmware space and, optionally, the second firmware space is marked as valid. Then, in step S420, the first firmware space is erased and/or marked as invalid. Next, in step S430, the firmware in the second firmware space is executed.

In step S450, because the second firmware space is valid, an error message is displayed or output. The output error message may take any form including a simple blinking light or detailed textual message describing the problem. Control then continues to step S460, where the firmware loading and storing method stops.

In the exemplary embodiment of the firmware loading and storing method according to this invention shown in FIGS. 6A and 6B steps S340 and S350 can be skipped. In this case, control proceeds directly from step S320 to step S360. Assuming an erased firmware space appears as an invalid firmware space, the operations performed in steps S340 and S350 are redundant to the operations performed in step S360 and step S370, respectively. Alternatively, steps S360 and S370 can be skipped as long as one of the first and second firmware spaces is previously erased.

The general firmware containing device 500 of FIGS. 1–3 and the methods of FIGS. 4–6B can be implemented using a programmed controller 510 and peripheral integrated circuit elements. However, the general firmware containing device 500 can also be implemented on a general purpose computer, a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the systems or methods of FIGS. 1–6B can be used.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for initiating program control in a system having at least a first firmware space and a second firmware space, comprising:
   determining if the first firmware space is erased;
   determining a validity of the first firmware space if the first firmware space is not erased;
   executing programs from the first firmware space if a firmware of the first firmware space is valid; and
   executing programs from the second firmware space if the first firmware space is erased or if the firmware of the first firmware space is not valid.

2. The method of claim 1, wherein a checksum is used to determine a validity of at least one of the first firmware space and the second firmware space.

3. The method of claim 1, further comprising executing programs from an error code space if the second firmware space is erased or if the second firmware space is not valid.

4. The method of claim 1, wherein executing programs from the second firmware space comprises:
   determining a validity of the second firmware space; and
   executing programs from the second firmware space if the second firmware space is valid.

5. The method of claim 4, wherein a checksum is used to determine the validity of the second firmware space.

6. The method of claim 4, further comprising executing programs from an error code space if the second firmware space is not valid.

7. The method of claim 6, wherein the error code space contains a download routine to program at least one of the first firmware space and the second firmware space.

8. A method for storing firmware in a system having at least a first firmware space and a second firmware space, comprising:
determining if the first firmware space is erased;
downloading the firmware in the first firmware space if the first firmware space is erased;
determining if the second firmware space is erased if the first firmware space is not erased; and
downloading the firmware to the second firmware space if the second firmware space is erased.

9. The method of claim 8, wherein downloading firmware to the first firmware space further comprises erasing the second firmware space.

10. The method of claim 8, wherein downloading firmware to the first firmware space further comprises executing programs from the first firmware space.

11. The method of claim 8, wherein the firmware includes a validity indicating portion.

12. A method for storing firmware in a system having a non-alterable memory and at least a first firmware space and a second firmware space, comprising:
determining a validity of the first firmware space;
downloading the firmware in the first firmware space if the first firmware space is not valid;
determining a validity of the second firmware space if the first firmware space is valid; and
downloading the firmware to the second firmware space if the second firmware space is not valid.

13. The method of claim 12, wherein the firmware includes a validity indicating portion.

14. The method of claim 12, wherein downloading firmware to the first firmware space further comprises erasing the second firmware space.

15. A method for storing firmware in a system having at least a first firmware space and a second firmware space, comprising:
determining if the first firmware space is erased;
downloading the firmware to the first firmware space if the first firmware space is erased;
determining if the second firmware space is erased if the first firmware space is not erased;
downloading the firmware to the second firmware space if the second firmware space is erased;
determining a validity of the first firmware space if both the first and second firmware spaces are not erased; and
downloading the firmware to the first firmware space if the first firmware system is not valid.

16. The method of claim 15, wherein determining the validity of the first firmware space comprises:
adding numerical values corresponding to a firmware of the first firmware space to form a sum;
adding a checksum in the first firmware space to the sum; and
comparing the sum to a predetermined value.

17. The method of claim 15, further comprising:
determining a validity of the second firmware space if both the first and second firmware spaces are not erased; and downloading the firmware to the second firmware space if the second firmware space is not valid.

18. An apparatus capable of storing firmware, comprising:
a first firmware space;
a second firmware space;
a first determining device capable of determining whether the first firmware space is erased and whether the second firmware space is a erased; and
a downloading device that stores the firmware to the first firmware space if the first firmware space is erased and stores the firmware to the second firmware space if the second firmware space is erased.

19. The apparatus of claim 18, further comprising a second determining device that determines a validity of the first firmware space; and wherein the downloading device stores the firmware to the first firmware space if the first firmware space is not valid.

20. The apparatus of claim 19, wherein the first firmware space includes a checksum portion for determining the validity of the first firmware space.

21. The apparatus of claim 19, wherein the second determining device further determines the validity of the second firmware space and wherein the downloading device downloads the firmware to the second firmware space if the second firmware space is not valid.

22. An apparatus capable of storing firmware, comprising:
a non-alterable memory;
a first firmware space;
a second firmware space;
a determining device that determines a validity of the first firmware space; and
a downloading device that stores the firmware in the first firmware space if the first firmware space is not valid;
wherein:
the determining device determines a validity of the second firmware space if the first firmware space is valid; and
the downloading device stores the firmware in the second firmware space if the second firmware space is not valid.

23. The apparatus of claim 20, wherein the first firmware space includes a checksum portion for determining the validity of the first firmware space.

24. An apparatus capable of being initiated, comprising:
a first firmware space;
a second firmware space;
a first determining device that determines whether at least one of the first firmware space and the second firmware space is erased;
a second determnining device that determines a validity of at least one of the first firmware space and the second firmware space; and
an executing device that executes programs from the first firmware space if at least one of the second firmware space is erased and the second firmware space is not valid.

25. The apparatus of claim 24, wherein the executing device executes programs from the second firmware space if the at least one of the first firmware space is erased and the first firmware space is not valid.

26. The apparatus of claim 24, wherein the first firmware space includes a checksum portion for determining the validity of the first firmware space.

* * * * *